(12) United States Patent
Baur et al.

(10) Patent No.: US 8,122,680 B2
(45) Date of Patent: Feb. 28, 2012

(54) CONCRETE CONDUIT MEMBERS

(75) Inventors: Kenneth C. Baur, Mohnton, PA (US); Alicia Allamena, Manheim, PA (US); Gary C. Graziano, Lititz, PA (US)

(73) Assignee: High Concrete Group LLC, Lancaster, PA (US)

(*) Notice: Subject to any disclaimer, the term of this patent is extended or adjusted under 35 U.S.C. 154(b) by 1292 days.

(21) Appl. No.: 11/428,657

(22) Filed: Jul. 5, 2006

(65) Prior Publication Data

US 2008/0005996 A1    Jan. 10, 2008

(51) Int. Cl.
*E04B 1/00* (2006.01)

(52) U.S. Cl. ........... 52/745.17; 52/19; 52/576; 405/134; 174/37

(58) Field of Classification Search .............. 52/19–21, 52/576, 741.1, 745.17, 745.18; 405/41, 80, 405/134–137; 174/37, 39; 220/4.03, 4.04; 404/26; 137/362, 373, 367, 372, 375
See application file for complete search history.

(56) References Cited

U.S. PATENT DOCUMENTS

| | | | |
|---|---|---|---|
| 1,850,276 A | | 3/1932 | Zifferer et al. |
| 2,025,814 A | * | 12/1935 | Goss ................................ 4/613 |
| 3,362,425 A | * | 1/1968 | Morris et al. ................. 137/362 |
| 3,585,771 A | | 6/1971 | Pinniger |
| 3,935,685 A | | 2/1976 | Howlett |
| 3,952,468 A | | 4/1976 | Soum |
| 3,965,630 A | | 6/1976 | Roberts |
| 3,999,355 A | | 12/1976 | Stucky |
| 4,043,133 A | | 8/1977 | Yegge |
| 4,141,190 A | | 2/1979 | Shimada |
| 4,261,598 A | | 4/1981 | Cornwall |
| 4,282,692 A | | 8/1981 | Potthast |
| 4,348,844 A | | 9/1982 | Schupack et al. |
| 4,409,764 A | | 10/1983 | Wilnau |
| 4,594,827 A | | 6/1986 | Finsterwalder |
| 4,625,940 A | | 12/1986 | Barton |
| 4,799,307 A | | 1/1989 | Reigstad et al. |
| 5,022,430 A | * | 6/1991 | Degooyer ...................... 137/362 |
| 5,035,097 A | | 7/1991 | Cornwall |
| 5,090,739 A | | 2/1992 | Pollard |
| 5,095,667 A | * | 3/1992 | Ryan et al. ........................ 52/20 |
| 5,182,885 A | | 2/1993 | Barton, Jr. |
| 5,189,859 A | | 3/1993 | Payer |
| 5,232,302 A | | 8/1993 | Wagner et al. |
| 5,245,806 A | | 9/1993 | Baur et al. |
| 5,272,851 A | | 12/1993 | De La Fuente |
| 5,386,675 A | | 2/1995 | Baur et al. |

(Continued)

FOREIGN PATENT DOCUMENTS

DE    7602125 U    5/1976

*Primary Examiner* — William Gilbert

(74) *Attorney, Agent, or Firm* — McNees Wallace & Nurick LLC

(57) ABSTRACT

An end connector for use in forming a conduit in a poured concrete member is provided. The end connector is adapted to be secured to a wall of a concrete member pouring form, the end connector having a surface feature to achieve a substantially fluid tight seal upon receiving an end of a tube that extends between opposite walls of the pouring form to form a conduit in the poured structural member. The end connector has a geometry capable of nesting with at least one other end connector to minimize a container size required to transport the end connectors.

18 Claims, 6 Drawing Sheets

U.S. PATENT DOCUMENTS

| | | |
|---|---|---|
| 5,398,909 A | 3/1995 | Sandwith |
| 5,509,240 A | 4/1996 | Barton, Jr. |
| 5,765,332 A | 6/1998 | Landin et al. |
| 5,878,448 A * | 3/1999 | Molter ............... 4/613 |
| 5,992,118 A | 11/1999 | Wagner et al. |
| 6,119,413 A | 9/2000 | Shaw et al. |
| 6,145,262 A | 11/2000 | Schrader et al. |
| 6,149,121 A | 11/2000 | Barton, Jr. |
| 6,327,825 B1 | 12/2001 | Sanders et al. |
| 6,389,764 B1 | 5/2002 | Stubler et al. |
| 6,746,178 B1 * | 6/2004 | Hensley et al. ............... 405/41 |
| 6,834,890 B2 | 12/2004 | Sorkin |
| 6,925,769 B2 | 8/2005 | Schmaltz, Jr. |
| 2004/0237439 A1 | 12/2004 | Powell |
| 2004/0244321 A1 | 12/2004 | Dincel |

* cited by examiner

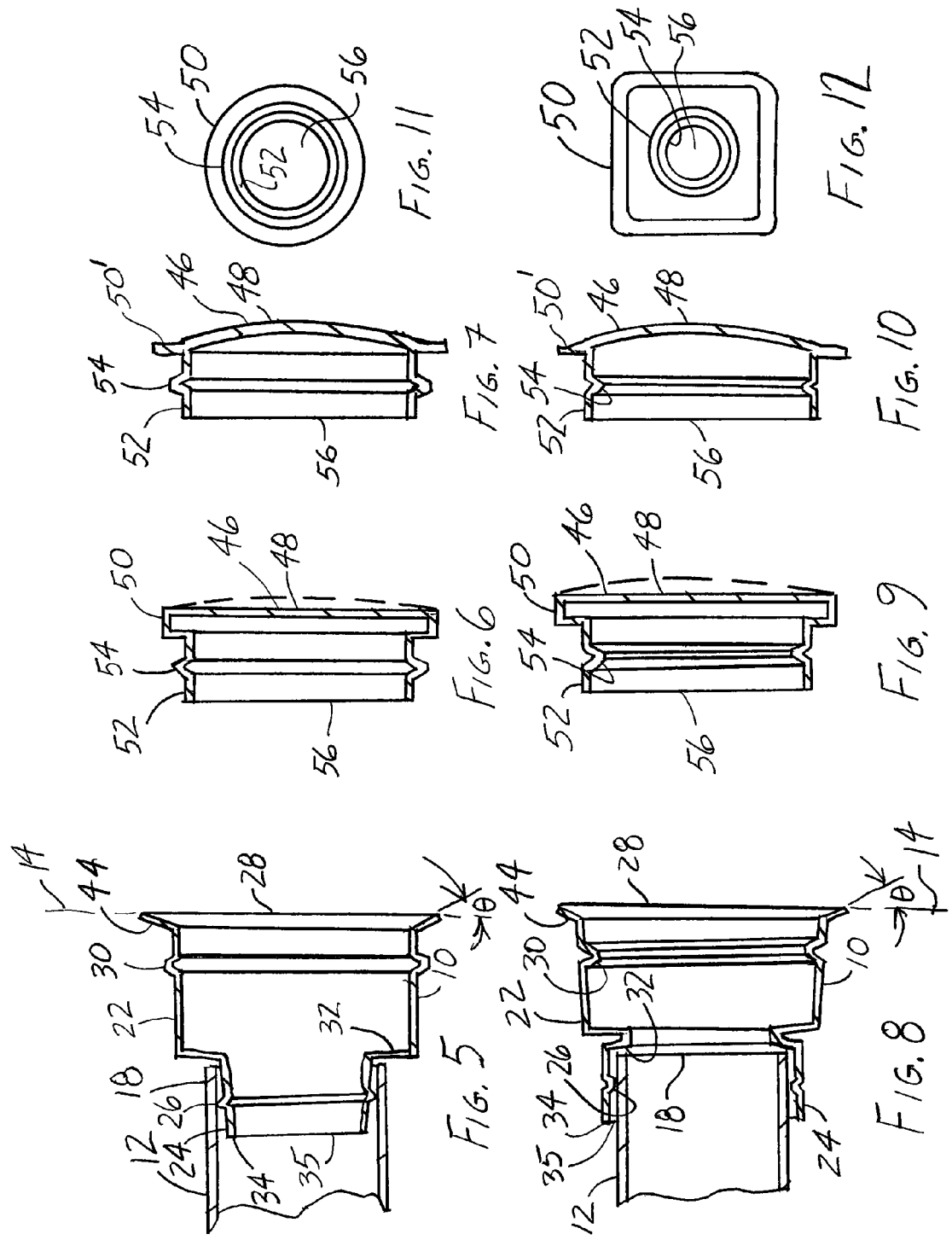

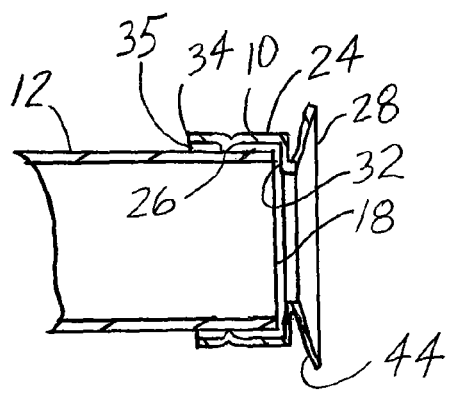
Fig. 13
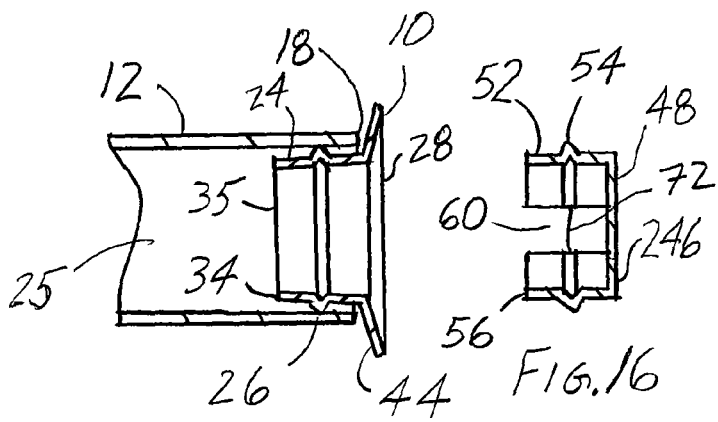
Fig. 14
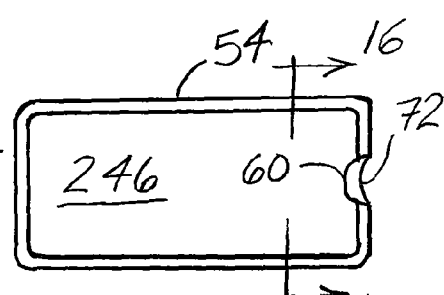
Fig. 16
Fig. 15

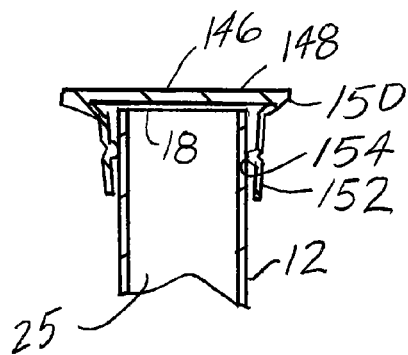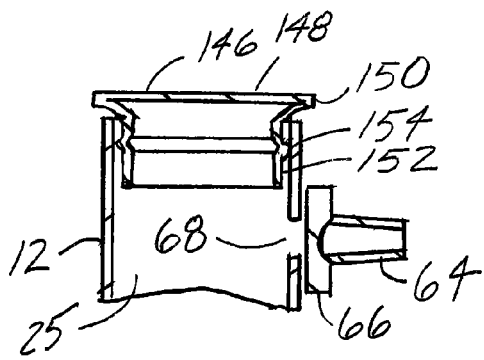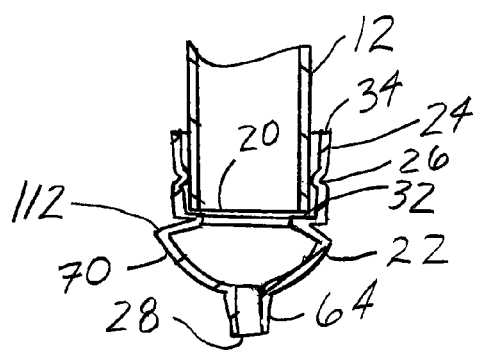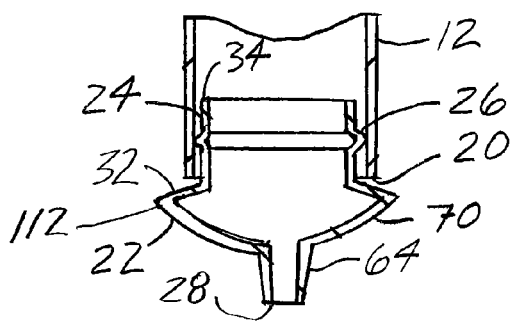
FIG. 20    FIG. 21
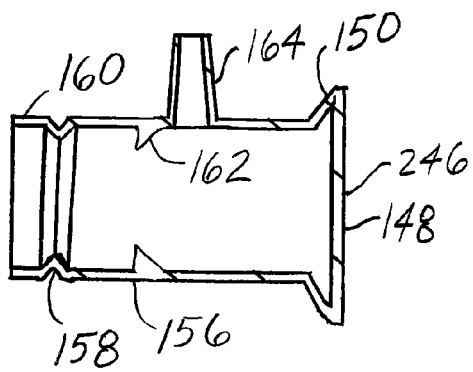
FIG. 22

CONCRETE CONDUIT MEMBERS

FIELD OF THE INVENTION

The present invention is directed to fittings for use in forming conduits in moldable building materials, and more specifically to fittings for use in forming conduits in concrete structures.

BACKGROUND OF THE INVENTION

Fittings have been used in concrete structural members, such as structural tees, panels, and connections between girders and columns to help assemble or reinforce the structural members together. Additionally, such fittings can provide convenient access for routing non-structural components, such as electrical wiring or plumbing. These fittings are placed in the concrete pouring forms prior to pouring the concrete, displacing concrete that is poured in the concrete forms to provide the desired passageways in the resulting concrete structural members.

Typically, the fittings have been of unitary construction. That is, the fittings are prefabricated to fit one specific pouring form for use in producing identical concrete members. There are disadvantages associated with the use of these prefabricated fittings. One disadvantage is the inability to use the fittings with pouring forms of different size. Other disadvantages are costs; both the costs of the fittings themselves and the costs associated with shipping the fittings, since the fittings are typically large and cumbersome.

What is needed is a fitting that can be modified for use with pouring forms of different size that is less expensive, both to produce and to ship.

SUMMARY OF THE INVENTION

The present invention relates to an end connector for use in forming a conduit in a poured concrete member including an end connector adapted to secure to a wall of a concrete member pouring form. The end connector has a surface feature to achieve a substantially fluid tight seal upon receiving an end of a tube that extends between opposite walls of the pouring form to form a conduit in the poured structural member. The end connector has a geometry capable of nesting with another end connector.

The present invention further relates to an end connector for use in forming a conduit in a poured concrete member including at least one end connector adapted to secure to a wall of a concrete member pouring form. The at least one end connector has an annular rib to achieve a substantially fluid tight seal upon receiving an end of a tube that extends between opposite walls of the pouring form to form a conduit in the poured structural member. The end connector has a geometry capable of nesting with another end connector.

The present invention still further relates to a method of forming a conduit in a poured concrete member. The steps include providing a pouring form having opposed walls for receiving concrete to form a concrete member. The method further includes connecting an end connector to at least one end of a conduit member having opposed ends, the end connector having a geometry capable of nesting with other end connectors to minimize a container size required to transport the end connectors. The method additionally includes installing the conduit member between the opposed walls, each end connector being brought into contact with one wall, including an arrangement wherein one end connector is brought into contact with one wall and the end of the conduit member opposite the end connector is brought into contact with the opposite wall.

An advantage of the present invention is that the end connector permits interchangeable use with differently sized concrete pouring molds.

A further advantage of the present invention is that the end connectors can be used in combination with inexpensive materials that connect to the end connectors.

A still further advantage of the present invention is that the end connectors are nestable with each other to reduce the size of shipping containers used in transporting connectors.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 5 is a cross section of an embodiment of an end connector of the present invention.

FIG. 6 is a cross section of a cap that is received by an end connector of the present invention.

FIG. 7 is a cross section of an alternate embodiment of a cap of the present invention.

FIG. 8 is a cross section of an embodiment of an end connector of the present invention.

FIG. 9 is a cross section of a cap that is received by an end connector of the present invention.

FIG. 10 is a cross section of an alternate embodiment of a cap of the present invention.

FIGS. 11-12 are end views of different embodiments of caps of the present invention.

FIG. 13 is a cross section of an alternate embodiment of an end connector of the present invention.

FIG. 14 is a cross section of an alternate embodiment of an end connector of the present invention.

FIG. 15 is a plan view of a cap that is received by an end connector of the present invention.

FIG. 16 is a cross section of a cap taken along view 16-16 of FIG. 15 of the present invention.

FIG. 20 is a partial cross section of a conduit, including an end connector and cap, for use in a structural member of the present invention.

FIG. 21 is a partial cross section of a conduit, including an end connector and cap, for use in a structural member of the present invention.

FIG. 22 is a cross section of an alternate embodiment of an end connector for use in a structural member of the present invention.

Wherever possible, the same reference numbers will be used throughout the drawings to refer to the same or like parts.

DETAILED DESCRIPTION OF THE INVENTION

Figure 1:
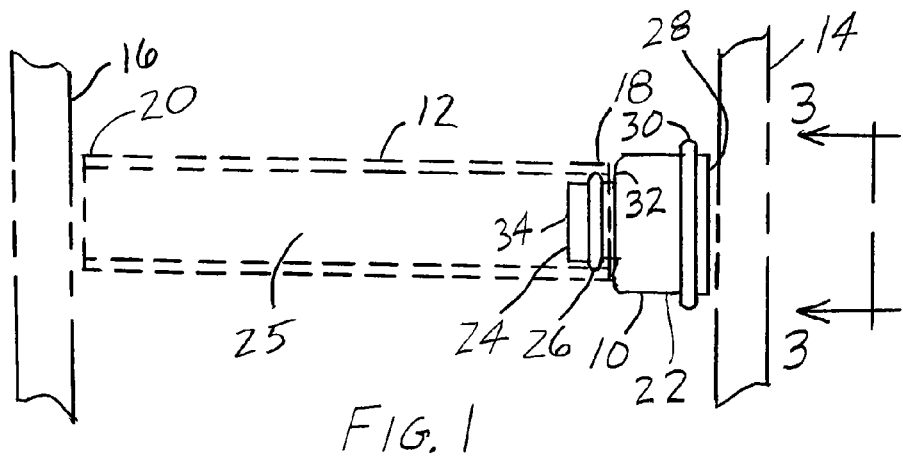
FIG. 1 is an elevation view of an end connector of the present invention.

The present invention is directed to an end connector 10 depicted in FIGS. 1-4. End connector 10 includes a body 22 having opposite ends 28, 32 that is preferably structurally enhanced by a surface feature 30, such as an annular rib, which is disposed between ends 28, 32. Extending from end 32 is a sleeve 24 that terminates at an end 34, which sleeve 24 having a surface feature 26 disposed between ends 32, 34. A tube 12 having ends 18, 20 is assembled with end connector 10 by directing end 34 of sleeve 24 inside end 18 of tube 12 until end 18 abuts or is adjacent to end 32 of body 22. Surface feature 26 closely conforms with the inside surface of tube 12, providing a substantially fluid tight connection that prevents infiltration of concrete latents, such as concrete paste (e.g., fine cement, water, sand), slag or pazzolans into body 22 and tube 12. In one arrangement, after assembly, tube 12 and end connector 10 are disposed in a pouring form having opposed walls 14, 16 so that end 20 of tube 12 abuts wall 16 and end 28 of body 22 abuts wall 14. It may also be necessary to secure tube 12 and end connector 10 in position between the form walls 14, 16. It is to be understood that the arrangement as shown in FIG. 1 could also include a second end connector 10 abutting end 20 of tube 12 so that end 28 of body 22 abuts each wall 14, 16 of the pouring form. Concrete is then poured into the pouring form and allowed to cure, ultimately forming a concrete structural member that further includes a passageway 25 formed by the tube 12 for structural use or access through the structural member.

Figure 3:
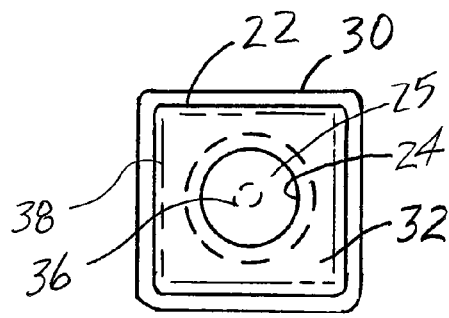
FIG. 3 is an end view of an end connector taken along view 3-3 of FIG. 1 of the present invention.
Figure 4:
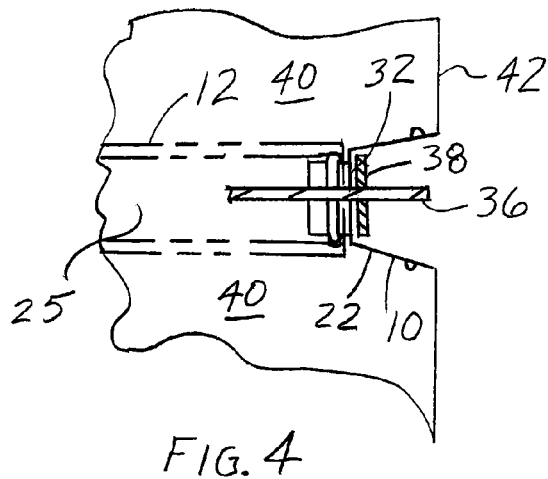
FIG. 4 is a cross section of a portion of a concrete structural member with a conduit formed using the end connector of the present invention.

One example of a structural use of passageway 25, as shown in FIGS. 3-4, is for threaded rod 36 to extend through tube 12 and inside of end connector 10. A nut 38 threadedly engaged with threaded rod 36 is brought into abutting contact with end 32. Although not drawn to scale in FIG. 4, end 32 is buttressed by concrete 40 to provide structural support when a tensile load is applied to the end of the threaded opposite end connector 10, such as between a spandrel and a column or between a girder and a column.

Figure 2:
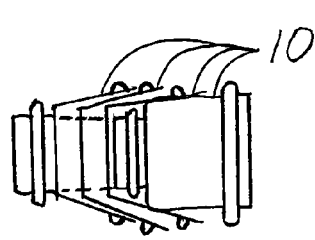
FIG. 2 is a partial cross sectional view of nested end connectors of the present invention.

Preferably, tube 12 is constructed of polyvinyl chloride (PVC) or other suitable material having sufficient strength and compatibility properties for use with concrete, and that is also capable of being easily cut to desired length. Typically, tube 12 is circular or rectangular in profile, but can be any closed geometric shape. By use of tubes 12 that are connected to end connectors 10, the cost of the conduit is significantly reduced because tube 12 is relatively inexpensive, as are the end connectors 10 by themselves, versus a unitary end connector and tube construction. Further, shipping costs are reduced for the end connectors, since by virtue of end 32 of body 22 being of reduced cross sectional profile dimensions than end 28 as measured by a plane substantially parallel to end 28, body 22 defines a taper, so that multiple end connectors shipped together can nest with each other, as shown in FIG. 2. Stated another way, due to the end connectors being capable of nesting, smaller shipping containers can be utilized to transport the end connectors.

FIGS. 5-7 and 8-10 are directed to alternate embodiments of end connectors 10 and caps 46. In FIG. 5, end 34 of sleeve 24 is inserted inside of tube 12 so that surface feature 26 is in physical contact with the inner surface of the tube 12. In other words, a substantially fluid tight seal is formed between the inner surface of the tube 12 and surface feature 26. Conversely, in FIG. 8, end 34 of sleeve 24 is inserted over the outside surface of tube 12 so that surface feature 26 is in physical contact with the outer surface of the tube 12. In other words, a substantially fluid tight seal is formed between the outer surface of the tube 12 and surface feature 26.

As shown in FIG. 5, body 22 preferably includes a surface feature 30, such as an annular or circumferential rib or thread disposed between ends 28, 32 of body 22. In addition to providing increased structural stiffness, surface feature 30 provides a retention region that helps retain the end connector 10 in position once the concrete structural member has cured. Stated another way, once the concrete cures, the end connector 10 is extremely difficult to remove from the concrete structural member. Disposed adjacent end 28 is a peripheral flange 44 that is preferably disposed substantially perpendicular to body 22. That is, flange 44 is configured to define an acute angle θ between flange 44 and wall 14 of a pouring form. Additionally, flange 44 is preferably configured so that upon installation between opposed walls of a pouring form, flange 44 is pressed against wall 14. Flange 44 is configured to flex, akin to a flanged suction device that adheres to a flat surface. Stated another way, flange 44 flexes an amount in a manner causing the angle θ between flange 44 and wall 14 to decrease. As angle θ decreases, the quality of the seal between flange 44 and wall 14 increases, providing a substantially fluid tight seal to prevent the introduction of concrete latents inside body 22.

FIG. 6 shows a cap 46 having a top 48 that extends to a peripheral rim 50, which further extends to a sleeve 52 that terminates at an end 56. Preferably disposed between end 56 and rim 50 is a surface feature 54, such as an annular rib or threads, that is configured to mesh with surface feature 30 when end 56 is directed inside of body 22. In a meshed position of surface features 30, 54, rim 50 abuts flange 44 to prevent moisture from accessing end connector 10 in a concrete structural member. Optionally, the surface of top 48 can be curved, as depicted in FIG. 6, for appearance and increased structural strength. In an alternate embodiment of cap 46, as shown in FIG. 7, rim 50 is replaced by a radially outward extending flange 50'. To further enhance the integrity of the seal, a bead of caulk (not shown) can be applied along the juncture between abutting surfaces of rim 50/flange 50' and flange 44. However, since the seal between rim 50/flange 50' and flange 44 is substantially fluid tight without the addition of caulk, a primary benefit of the caulk seal is to decrease accessibility to the passageway 25. In other words, if access to the conduit passageway 25 that is defined by the end connector 10 and tube 12 is not originally required or used, the unused conduit passageway 25 may be occupied by animals for nesting purposes, which is undesirable. Additionally, sealing unused passageways 25 preserves the passageway in case access or use is later required.

End connectors 10 and caps 46 as shown in FIGS. 5-7 are substantially similar to end connectors 10 and caps 46 as shown in FIGS. 8-10. However, one difference is that in FIG. 8, sleeve 24 and surface feature 26 slide over the outer surface of tube 12 so that a substantially fluid tight seal is formed between surface feature 26 and the outer surface of tube 12. Additionally, as shown in FIG. 8, the surface feature formed in body 22 in directed radially inward, versus radially outward as shown in FIG. 5. Similarly, in FIGS. 9-10, surface feature 54 of cap 46 is also directed radially inward to mesh with surface feature 30 in FIG. 8, while in FIGS. 6-7, surface feature 54 of cap 46 is directed radially outward to mesh with outwardly directed surface feature 30 in FIG. 5. FIGS. 11-12 are respective views of the underside of cap 46 for both FIGS.

6-7 and 9-10. FIG. 11 shows a cap configuration having a circular profile, while FIG. 12 shows a cap configuration having a rectangular profile.

FIGS. 13-14 show further alternate embodiments of end connector 10. In FIG. 13, end connector 10 includes a sleeve 24 having opposed ends 32,34 and a surface feature 26 disposed between the opposed ends. End 34 includes an opening 35 so that end connector 10 is in fluid communication with passageway 25 of tube 12. Extending from end 32 is flange 44. Essentially, end connector 10 in FIG. 13 is substantially similar to end connector 10 in FIG. 8 with body 22 removed, except for flange 44. Similarly, end connector 10 in FIG. 14 is substantially similar to end connector 10 in FIG. 5 with body 22 removed, except for flange 44.

FIGS. 15-16 show an alternate embodiment of cap 46, designated as 246, which includes a sleeve 52 that extends to top 48 with surface feature 54 being disposed between end 56 and top 48. Cap 246 is configured so that surface feature 54 meshes with surface feature 26 of end connector 10. However, cap 246 differs from cap 46 (FIGS. 6-7 and 9-10) in that cap 246, when installed, is intended to be substantially disposed inside of sleeve 24, or if not substantially disposed inside of sleeve 24, at least such that top 48 is recessed from end 28 of flange 44. In other words, there are no exposed edges of top 48 that are accessible, which makes removal virtually impossible without destroying cap 246. To permit removal of cap 246, a specially configured slot 60 is provided to receive a removal tool (not shown). Optionally, removal with the removal tool can be made easier by the addition of a strap 72 that connects opposed sides of slot 60 to permit more convenient removal of the cap 246. Upon the application of a lateral force to strap 72, the opposed edges of slot 60 are drawn toward each other, thereby disengaging meshing surface feature 54 of cap 246 from surface feature 26 of body 22 of end connector 10. Due to the size and location of the exterior opening defined by slot 60, including partial shielding of flange 44, there is provided little opportunity for precipitation or other moisture to enter passageway 25.

Figure 17:
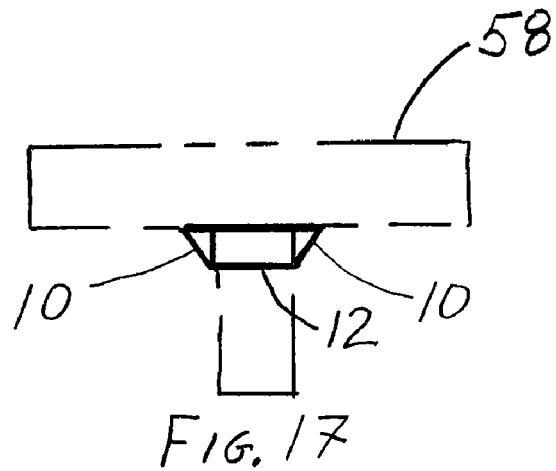
FIG. 17 is a view of a conduit formed in a structural tee member of the present invention.
Figure 18:
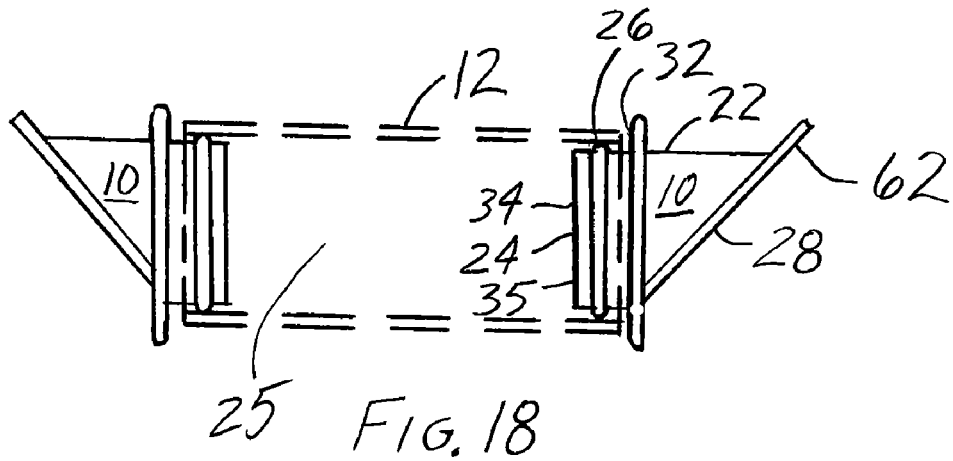
FIG. 18 is a cross section of a conduit, including opposed end connectors, for use in a structural tee member of the present invention.
Figure 19:
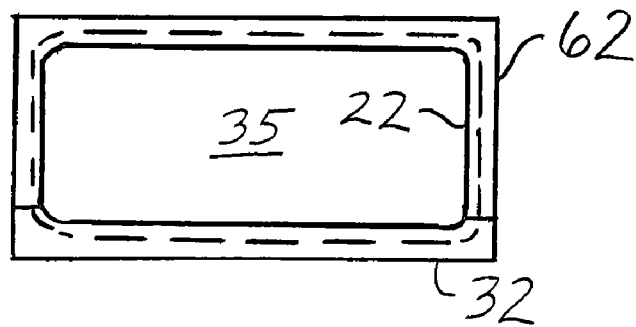
FIG. 19 is an end view of an end connector for use in a structural tee member of the present invention.
Figure 23:
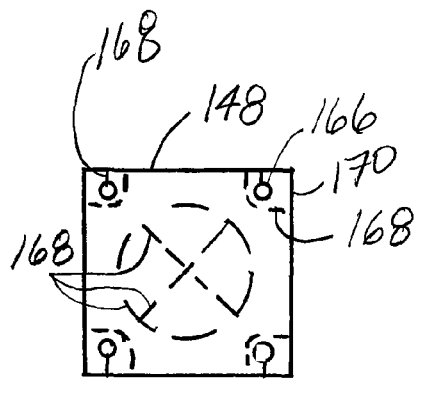
FIGS. 23-26 are different embodiments of end connectors of the present invention.

FIGS. 17-19 are directed to a conduit formed in a structural tee 58, preferably at the junction between the two perpendicular portions of tee 58. In one embodiment, end connector 10 includes a body 22 having opposite ends 28, 32. End 28 further includes a lip 62 that extends along the periphery of opening 35 and as shown in FIG. 18, lip 62 and end 32 define portions of the of the peripheral opening 35. Lip 62 can also be contiguous about the periphery of opening 35. By virtue of lip 62 by itself or in combination with end 32, an effective seal with the concrete pouring form is established to substantially prevent the introduction of concrete latents, as previously described, from entering opening 35 of body 22. Extending from end 32 is a sleeve 24 that terminates at an end 34 having a surface feature 26 disposed between end ends 32, 34. Tube 12 having ends 18, 20 is assembled with each end connector 10 by directing ends 34 of each end connector 10 inside respective ends 18, 20 of tube 12 until ends 18, 20 abut or are adjacent to each end 32 of body 22 of the end connectors. Surface feature 26 closely conforms with the inner surface of tube 12, providing substantially fluid tight connections that prevent the introduction of concrete latents between the tube ends and the end connectors. After assembly, tube 12 and end connectors 10 are disposed in a pouring form having opposed, non-parallel walls 14, 16 so that ends 28 of end connectors 10 abut concrete form walls 14, 16. It is to be understood that walls 14, 16 are not necessarily linear, i.e., wall 14, 16 can be curved. Concrete is then poured into the pouring form and allowed to cure, ultimately forming a concrete structural tee member that further includes a passageway 25 for structural use or access through the structural member.

FIGS. 20-21 show yet another alternate embodiment of end connectors for use in providing a conduit in concrete members, such as for connecting precast concrete panels to each other. Such a connection is similar in principle of operation set forth in U.S. Pat. No. 5,134,828 issued to Applicant on Aug. 4, 1992 and incorporated herein by reference in its entirety. Cap 146 includes a top 148 having a rim 150 that extends to a sleeve 152 and has a surface feature 154 formed between the opposed ends of the sleeve. Sleeve 152 is directed over end 18 of tube 12, a substantially fluid tight seal being formed between the outer surface of tube 12 and surface feature 154. The opposite side of the conduit or passageway 25, which is enclosed by an end connector 110, does not extend to an edge of the concrete member. That is, in contrast to other conduit arrangements previously discussed, end connector 110 is disposed inside of the concrete member without abutting a concrete pouring form wall. In other words, the conduit, or passageway 25, defines a "blind hole", or an opening that does not penetrate the opposed ends of the concrete member.

As shown in FIG. 20, end connector 110 includes body 22 preferably having a curved portion 112, which provides structural stiffening, i.e., without the need for a surface feature, such as an annular or circumferential rib. In addition to providing increased structural stiffness, curved portion 112 provides a retention region that helps retain the end connector 110 in position once the concrete structural member has cured. Stated another way, once the concrete cures, the end connector 110 is extremely difficult to remove from the concrete structural member. An additional benefit of the curved portion 112 is the ability to collect small amounts of liquid introduced into passageway 25, thereby protecting passageway 25 from damage due to expansion of the frozen liquid.

Extending from one end of curved portion 112 is a sleeve 24 having a surface feature 26 disposed between curved portion 112 and end 34 of sleeve 24. End 34 of sleeve 24 is inserted over end 20 of tube 12 so that surface feature 26 is in physical contact with the outer surface of the tube 12. In other words, a substantially fluid tight seal is provided between the outer surface of the tube 12 and surface feature 26. Optionally, extending from the end of body 22 opposite sleeve 24 is a port 64 into which can be provided grout or other material to substantially fill passageway 25 after a threaded shaft or other structural member is installed to connect two concrete panels together.

In an alternate embodiment, referring to FIG. 21, a port can be provided separately from cap 146 or end connector 110. An opening 68 can be formed in a desired location in tube 12. A base 66 secured to a port 64 can then be bonded to the tube 12 over opening 68 using a suitable adhesive or bonding agent. FIG. 21 also shows cap 146 and end connector 110 constructions similar to those in FIG. 20, with the exception that sleeves 24, 152 in FIG. 21 are secured to the inner surface of tube 12, while the respective sleeves 24, 152 in FIG. 20 are secured to the outer surface of tube 12.

Referring to FIG. 22, cap 246 provides a unitary construction of top 148 extending to a rim 150, further extending to a body 156 that includes a port 164 formed in body 156. Body 156 extends to a sleeve 160 that includes a surface feature 158 disposed therebetween. An end of tube 12 is directed inside sleeve 160 and body 156, the penetration of the end of tube 12 being limited by abutment with top 148 or by an optional rib 162.

Figure 24:
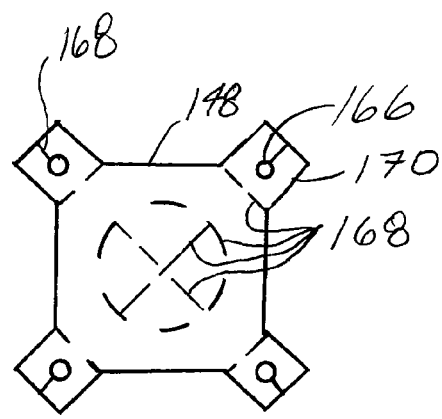
Figure 25:
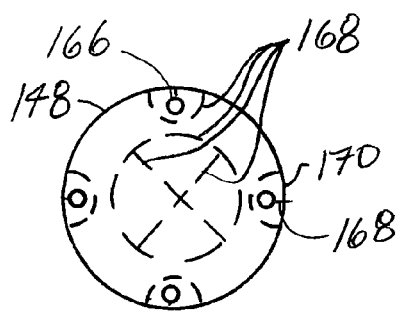
Figure 26:
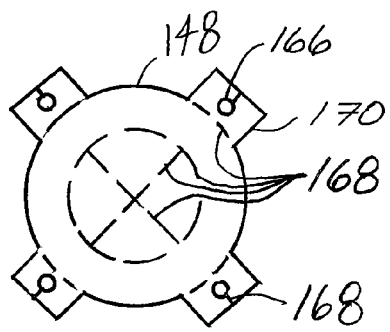

Referring to FIGS. 23-26, top 148 of cap 146 can be configured to include apertures 166 sized to receive fasteners that are used to secure top 148 to a wall of a concrete pouring form. As shown in FIGS. 24, 26, apertures 166 are formed in tabs 170 that extend outside the profile defined by top 148, while in FIGS. 23, 25, tabs 170 are disposed within the profile defined by top 148. To obtain the concrete structure after curing, the pouring form wall must be separated from the concrete structure. It is important that the apertures 166 in cap 146 containing a fastener securing cap 146 to the pouring form wall can be reliably separated from cap 146 in a manner that does not damage the remaining portion of the cap. In other words, it is desired that either the tabs 170 are removable from the remaining portion of cap 146, or at the least, that the apertures 166 tear-out. To achieve the desired tab 170 removal or aperture 166 tear-out, prepared regions 168 of reduced material thickness are formed along a predetermined path along the tabs 170 and apertures 166. These prepared regions can also include perforating, such perforations including partial material thickness reduction or even through slits formed in a patterned arrangement or multiple perforation patterns if desired. Additional prepared regions 168 can also be formed in the top 148 to permit passageway 25 to be accessed, such as to introduce a fastening member and grout material. In other words, by striking along the prepared regions with a blunt object, the top 148 tears along the prepared regions, for providing access to passageway 25 to insert a fastening member and grout material.

It is to be understood that tear-away tabs and apertures can also be used with the end connectors of the present invention.

It is to be understood that the surface features 26, 30 can define a single rib or more than one rib of similar or differing size, or can form threads that are received by corresponding threads formed in the surface of the adjacent surface of the tube 12. Similarly, other arrangements can also be used that provide a substantially fluid tight seal between the adjacent surfaces to substantially prevent the introduction of concrete latents inside the tube 12.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of forming a conduit in a poured concrete member, the steps comprising:
    providing a pouring form having opposed walls for receiving concrete to form a concrete member;
    connecting an end connector to at least one end of a conduit member having opposed ends, the end connector having a geometry capable of nesting with another end connector to minimize a container size required to transport a plurality of end connectors;
    the end connector further having a perforation extending to an edge of the end connector, the perforation permitting removal of the connector without removal of the fastener and without damaging the connector;
    installing the conduit member between the opposed walls, each end connector being brought into contact with one wall, including an arrangement wherein one end connector being brought into contact with one wall and the end of the conduit member opposite the end connector being brought into contact with the opposite wall.

2. The method of claim 1 wherein the step of installing the conduit member includes installing a fastener in the end connector to secure the end connector to the wall.

3. A connector for use in forming a conduit in a poured concrete member comprising:
    a first end connector being integrally formed and further comprising an opening, the opening having a flexible peripheral first surface feature adapted to be directly secured to a wall of a concrete member pouring form during pouring of concrete into the form, the first end connector having a second surface feature to achieve a substantially fluid tight seal upon receiving a first end of a tube that extends between opposite walls of the pouring form to form a conduit in the poured concrete member, the first end connector having a tapered geometry to nest with another first end connector and further having a perforation extending to an edge of the first end connector, the perforation permitting removal of the connector without removal of the fastener and without damaging the connector;
    wherein the first end connector forms a conduit in the poured concrete member.

4. The connector of claim 3 wherein the second surface feature is an annular rib to structurally enhance the connector.

5. The connector of claim 4 wherein the annular rib is continuous.

6. The connector of claim 5 wherein the annular rib extends outwardly.

7. The connector of claim 5 wherein the annular rib extends inwardly.

8. The connector of claim 3 wherein the poured concrete member is selected of at least one of a tee, girder, or girder to column connection.

9. The connector of this claim 3 further comprising a second surface feature.

10. The connector of claim 3 wherein the first end connector has an aperture to receive a fastener to secure the first end connector to a wall of a pouring form.

11. The connector of claim 10 wherein the aperture is disposed with a region that is separable from the remainder of the first end connector without removal of the fastener and without damaging the connector.

12. The connector of claim 3 further comprising a second end connector substantially identical to the first end connector for receiving a second end of the tube opposite the first end.

13. The connector of claim 3 further comprises a cap received by the first end connector substantially covering the first end connector.

14. The connector of claim 13 wherein the cap includes a predetermined path of reduced thickness configured to rupture substantially along the predetermined path upon impact with a blunt instrument.

15. The connector of claim 13 wherein the cap includes a slot.

16. The connector of claim 13 wherein the cap and the first end connector have meshing features.

17. The connector of claim 16 wherein the meshing features include annular ribs or threads.

18. An end connector for use in forming a conduit in a poured concrete member comprising:
    at least one end connector being integrally formed and further comprising an opening, the opening having a flexible peripheral first surface feature adapted to be directly secured to a wall of a concrete member pouring form during pouring of concrete, the at least one end connector having an annular rib to achieve a substantially fluid tight seal upon receiving an end of a tube that extends between opposite walls of the pouring form to form a conduit in the poured structural member, the at least one end connector having a tapered geometry capable of nesting with another end connector;
    the end connector further having a perforation extending to an edge of the end connector, the perforation permitting removal of the connector without removal of the fastener and without damaging the connector;
    wherein the at least one end connector forms a conduit in the poured concrete member.

* * * * *